United States Patent
Lee et al.

(10) Patent No.: US 8,223,641 B2
(45) Date of Patent: Jul. 17, 2012

(54) DYNAMIC SETTING OF OPTIMAL BUFFER SIZES IN IP NETWORKS

(75) Inventors: Jay J. Lee, San Ramon, CA (US); Thomas Tan, San Jose, CA (US); Deepak Kakadia, Union City, CA (US); Emer M. Delos Reyes, Martinez, CA (US); Maria G. Lam, Irvine, CA (US)

(73) Assignee: Cellco Partnership, Basking Ridge, NJ (US)

( * ) Notice: Subject to any disclaimer, the term of this patent is extended or adjusted under 35 U.S.C. 154(b) by 269 days.

(21) Appl. No.: 12/181,042

(22) Filed: Jul. 28, 2008

(65) Prior Publication Data

US 2010/0020686 A1 Jan. 28, 2010

(51) Int. Cl.
*H04J 1/16* (2006.01)
(52) U.S. Cl. .......................... 370/234; 370/232; 370/415
(58) Field of Classification Search .......... 370/229–240; 307/231–234, 395.72, 412–421, 429
See application file for complete search history.

(56) References Cited

U.S. PATENT DOCUMENTS

| | | | |
|---|---|---|---|
| 4,914,650 A * | 4/1990 | Sriram | 370/235 |
| 5,581,544 A * | 12/1996 | Hamada et al. | 370/253 |
| 5,974,518 A | 10/1999 | Nogradi | |
| 6,530,042 B1 * | 3/2003 | Davidson et al. | 714/47 |
| 6,683,889 B1 | 1/2004 | Shaffer et al. | |
| 6,757,292 B2 | 6/2004 | Pate et al. | |
| 6,862,298 B1 | 3/2005 | Smith et al. | |
| 7,359,324 B1 | 4/2008 | Ouellette et al. | |
| 7,551,623 B1 * | 6/2009 | Feroz et al. | 370/395.21 |
| 2001/0038634 A1 * | 11/2001 | Dally et al. | 370/412 |
| 2002/0052967 A1 * | 5/2002 | Goldhor et al. | 709/231 |
| 2003/0189900 A1 * | 10/2003 | Barany et al. | 370/229 |
| 2004/0264489 A1 * | 12/2004 | Klemets et al. | 370/428 |
| 2005/0094645 A1 * | 5/2005 | Sridhar et al. | 370/395.42 |
| 2005/0152373 A1 * | 7/2005 | Ali | 370/395.4 |
| 2005/0207387 A1 * | 9/2005 | Middleton et al. | 370/347 |
| 2006/0026179 A1 * | 2/2006 | Brown et al. | 707/100 |
| 2006/0045008 A1 * | 3/2006 | Sun et al. | 370/229 |
| 2006/0109789 A1 | 5/2006 | Skerritt | |

(Continued)

FOREIGN PATENT DOCUMENTS

WO  WO 2007/147544 A1  12/2007

OTHER PUBLICATIONS

Appenzeller, G., et al., "Sizing Router Buffers", Session 8: Congestion Control, SIGCOMM'04, Aug. 30-Sep.3, 2004, pp. 281-292, Portland, Oregon USA.

(Continued)

*Primary Examiner* — Kwang B Yao
*Assistant Examiner* — Kenan Cehic (57) ABSTRACT

A communications system provides a dynamic setting of optimal buffer sizes in IP networks. A method for dynamically adjusting buffer capacities of a router may include steps of monitoring a number of incoming packets to the router, determining a packet arrival rate, and determining the buffer capacities based at least partially on the packet arrival rate. Router buffers are controlled to exhibit the determined buffer capacities, e.g. during writing packets into and reading packets from each of the buffers as part of a packet routing performed by the router. In the disclosed examples, buffer size may be based on the mean arrival rate and one or more of mean packet size and mean waiting time.

25 Claims, 3 Drawing Sheets

U.S. PATENT DOCUMENTS

| | | | |
|---|---|---|---|
| 2006/0165166 A1* | 7/2006 | Chou et al. | 375/240.05 |
| 2006/0200578 A1* | 9/2006 | Sherer et al. | 709/233 |
| 2007/0121505 A1* | 5/2007 | Ansari et al. | 370/230 |
| 2009/0080334 A1* | 3/2009 | DeCusatis et al. | 370/237 |
| 2010/0091769 A1* | 4/2010 | Magliaro et al. | 370/352 |

OTHER PUBLICATIONS

Morris, R., "Scalable TCP Congestion Control", Proceedings IEEE INFOCOM 2000 The Conference on Computer Communications Nineteenth Annual Joint Conference on the IEEE Computer and Communications Societies, Mar. 26-30, 2000, pp. 1176-1183, vol. 3, IEEE.

Gorinsky, S., et al., "Link Buffer Sizing: A New Look at the Old Problem", Proceedings of the 10th IEEE Symposium on Computers and Communications (ISCC 2005), 2005, IEEE Computer Society.

Villamizar, C., et al., "High Performance TCP in ANSNET", Computer Communication Review A Quarterly Publication of ACM SIGCOMM, Oct. 1995, pp. 45-60, vol. 24, No. 5, ISSN #: 0146-4833.

International Search Report and Written Opinion of the International Searching Authority issued in International Patent Application No. PCT/US2009/04357 dated Sep. 17, 2009.

T.-Y. Tan et al., "Adaptive resource negotiation based control for real time applications," Computer Communications, vol. 24, No. 13, Aug. 15, 2001, pp. 1283-1298.

D. Ippoliti et al., "Packet Scheduling with Buffer Management for Fair Bandwidth Sharing and Delay Differentiation," Computer Communications and Networks, 2007, ICCCN 2007, Proceedings of 16th Annual International Conference on IEEE, Aug. 1, 2007, pp. 569-574.

Extended European Search Report issued in European Patent Application No. EP 09803258.4 dated Jul. 18, 2011.

* cited by examiner

DYNAMIC SETTING OF OPTIMAL BUFFER SIZES IN IP NETWORKS

TECHNICAL FIELD

The present subject matter relates to a dynamically adjusted optimal buffer size in a router or the like, based upon the number of incoming packets and moving averages of packet arrival rates.

BACKGROUND

Buffers are widely used in many types of packet type networking equipment; for example routers, Base Stations (BSs), wireless Access Points (APs), Packet Data Serving Nodes (PDSNs), Serving General Packet Radio Services (GPRS) Support Nodes (SGSNs), Gateway GPRS Serving Nodes (GGSNs), etc. In recent years, the proper setting of buffer sizes in routers/switches (or any network nodes that process Internet Protocol (IP) packets) utilized in IP Networks in order to meet the performance requirements of IP-based applications has impacted network performance.

Traditional Transmission Control Protocol/Internet Protocol (TCP/IP) communications have been primarily used for applications such as file transfer, emails, web browsing, etc. While the TCP protocol employs a built-in retransmission mechanism that provides reliable, in-order delivery of data, making it suitable for applications capable of tolerating network delays, these same applications are not as accommodating in regards to packet loss. As a result, the performance objective of these TCP-based applications and corresponding network services primarily is to minimize packet loss, as opposed to packet delay.

The exponential growth of the Internet has prompted the introduction of new interactive real-time applications using packet transport, such as Voice over IP (VoIP) and packet-based Video Telephony (VT). However, these real-time applications are very sensitive to packet delay and delay variation (jitter), while more tolerant of packet loss. Therefore, these interactive real-time applications have performance requirements that are contrary to those discussed earlier regarding TCP. As a result, the performance objective of real-time applications is to minimize end-to-end packet delays in the network. For example, in VoIP, any end-to-end packet delays smaller than 150 milliseconds (msec) are not perceived by a human listener; delays between 150 and 350 msec can be acceptable; but delays exceeding 350 msec will seriously impair the interactivity in voice conversation. Although the underlying transport still uses IP packets, these delay-sensitive applications typically use User Datagram Protocol (UDP) instead of TCP because UDP does not retransmit any lost packets (like in TCP). Furthermore, the retransmission of packets results in a long round-trip delay which is not useful for delay sensitive real-time applications.

A router is a computing device that connects at least two networks or devices together. Routers have software and hardware components that are typically tailored to the tasks of routing and forwarding packet-based data in a computer network. Routers use protocols such as Internet Control Message Protocol (ICMP) to communicate with each other, data headers, routing tables and routing protocols to determine the best path for forwarding the packets of data between any two hosts. Routers typically contain a specialized operating system, Random Access Memory (RAM), Non-Volatile RAM (NVRAM), flash memory, and one or more processors. However, with the proper software, even commodity PCs can act as routers. Routers also contain buffers in order to temporarily store data that the router is not yet ready to process.

A buffer is a temporary location to store or group information in hardware or software. Buffers are used whenever data is received in sizes or at rates that may be different than the ideal size or rate for the hardware or software that utilizes the buffer. For example, a 64-bit processor on a 16-bit bus may contain a buffer to hold 16-bit requests until they equal 64-bits. Another exemplary use of buffers is to prevent a hardware device from becoming overloaded or saturated with information. In this example, a buffer is used in order to temporarily store data until the device or program is ready to receive the data, as opposed to unloading the data onto the unready device. Buffers should be optimized in size in order to work efficiently. However, sometimes buffers, just like any other storage device, can become full of too much data. For example, if a buffer receives too much data, and cannot process the data fast enough, then some of the received data may be dropped by the buffer. Similarly, the buffers contained in routers may also become full as one of the networks the router is connected to becomes congested. As a result, the router and buffer may drop packets of data.

In order to reduce the probability of dropping packets of data, larger buffers at each router may be employed and/or multiple buffers at each router may be employed. While the larger buffers will certainly minimize the packet loss in the network in the case of traffic congestion, as the buffers fill up the delays encountered by each packet would increase dramatically. On the other hand, if the buffers are too small, while the delay may be reduced, the packets will be dropped too frequently. Hence, there is a tradeoff between a buffer that is small enough to meet the packet delay requirements and, at the same time, large enough to have a high throughput (low packet loss).

In today's IP networks, there are three primary methods for setting buffer sizes. However, these methods were developed in order to minimize the packet loss for TCP-based large file transfer applications. As discussed earlier, TCP is not suitable for interactive delay-sensitive applications, e.g. real-time. The three methods are: Bitrate-Delay Product (BDP), Over-Square Root and Connection Proportion Allocation.

The BPD method sets the buffer size to be equal to the product of the Bitrate of the Outgoing Link and the Round-Trip Delay as shown in equation (1) below; where Bitrate is the Link Speed, and the Round-Trip Delay is the Round-Trip-Time (RTT) of a TCP connection.

$$\text{Buffer Size} = \text{Link Speed} \times \text{RTT} \quad (1)$$

However, the BPD method considers only one TCP connection, and not multiple TCP connections. For example, if the link speed is 100 megabits per second (Mbps) and the RTT for a TCP connection is 500 msec, then the buffer size is (100 Mbps)×(500 msec)=50 megabits (MB). In estimating the RTT of a TCP connection, the BPD utilizes a random TCP connection and uses its RTT for computing the buffer size.

The Over-Square Root Method uses several competing TCP connections in computing the buffer size. Thus, the buffer size should be set to be equal to the BDP of the outgoing link divided by the square root of the number of TCP connections as shown in equation (2) below. The rationale is based on the observation that some TCP connections might lose no packets during an overflow of the buffer. Therefore, it corrects the buffer size requirement of BPD by dividing the square root of the number of TCP connections.

$$\text{Buffer Size} = \text{BDP}/(\text{\# of TCP Connections})^{1/2} \quad (2)$$

The Connection Proportional Allocation Method sets the buffer size to be proportional to the number of TCP connections. The rationale is that the buffer must accommodate relatively few packets from each connection in order to avoid a high packet drop rate, and that TCP works well if the network stores roughly six packets per active TCP connection.

In reviewing the above three methods, all three methods are adapted for TCP-based applications and do not work well in today's IP networks, in particular for interactive real-time applications such as VoIP and video telephony based on UDP. Furthermore, there are some serious issues with these existing methods. First, since there are many TCP connections passing through the router it is not clear which TCP connection should be used for the BPD computation. Additionally, each TCP connection has its own round-trip delay, but the BPD computation is based on only one TCP connection. Thus, the buffer size is dependent upon the random selection of a single TCP connection because BPD is directly proportional to the one round-trip delay of TCP.

Second, the IP router does not know the round-trip delays for each TCP connection. Thus, these methods depend on outside signaling of other routers and end systems to estimate the RTT of the TCP connection.

Third, all three methods are designed for long, large file transfers over a TCP connection; hence, buffer sizes are over-estimated and are not suitable for real-time applications based on UDP. Therefore, it is not feasible to implement the existing methods for real-time IP applications not using TCP, as these methods require round-trip delays of TCP connections that are not available at the IP router.

Fourth, the last two methods are inconsistent with each other in attempting to accommodate multiple TCP connections in buffer size estimation.

Hence a need exists for determining the optimal buffer size in an IP network particularly as can be adapted for real-time applications or the like that are sensitive to latency.

SUMMARY

The teachings herein alleviate one or more of the above noted problems with determining and setting an optimal buffer size ($\overline{B}_T$ in bits and $\overline{N}_t$ in packets) at a node in an IP network.

A router, method and computer program product are disclosed herein, which incorporate concepts to improve the setting of buffer sizes for applications in an IP network.

For example, a method and/or a communication system software provide a mechanism for dynamically setting optimal buffer sizes in today's IP networks. This method and/or communication system software may be applied to a Quality of Service (QoS) queue, based on its QoS requirements.

For example, a method for dynamically adjusting a first buffer capacity of a router and a second buffer capacity of the router may include monitoring a number of incoming packets to the router and determining a packet arrival rate. The first and second buffer capacities of the router are determined based at least partially on the packet arrival rate. The router buffers are controlled to exhibit the determined buffer capacities, e.g. during writing packets into and reading packets from each of the first and second buffers as part of a packet routing performed by the router.

An exemplary router may include dynamically adjustable buffers. The router is configured to dynamically adjust a first buffer capacity of the router and a second buffer capacity of the router by performing functions including monitoring a number of incoming packets to the router, determining a packet arrival rate, and determining the first and second buffer capacities based at least partially on the packet arrival rate. The router buffers are controlled to exhibit the determined buffer capacities, e.g. during writing packets into and reading packets from each of the first and second buffers as part of a packet routing performed by the router.

The methodology may be implemented in any type of IP network offering data services. The methodology supports any application type, both real-time and non real-time applications. In particular, the exemplary methodology is suitable for interactive real-time application in today's IP networks, such as VoIP and VT, and the performance of UDP traffic may be optimized. The exemplary methodology may utilize the relationship among mean arrival rate, mean waiting time, link speed, and mean packet size. The mean arrival rate and packet size may be computed for a given time window to provide dynamic adjustment of optimal buffer sizes to compensate for the bursty-nature of IP traffic.

An advantage provided by the disclosed approach is that outside signaling from other routers or end systems in order to estimate the round-trip delay or RTT of TCP connections is not required.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Reference now is made in detail to the examples illustrated in the accompanying drawings and discussed below.

Figure 1:
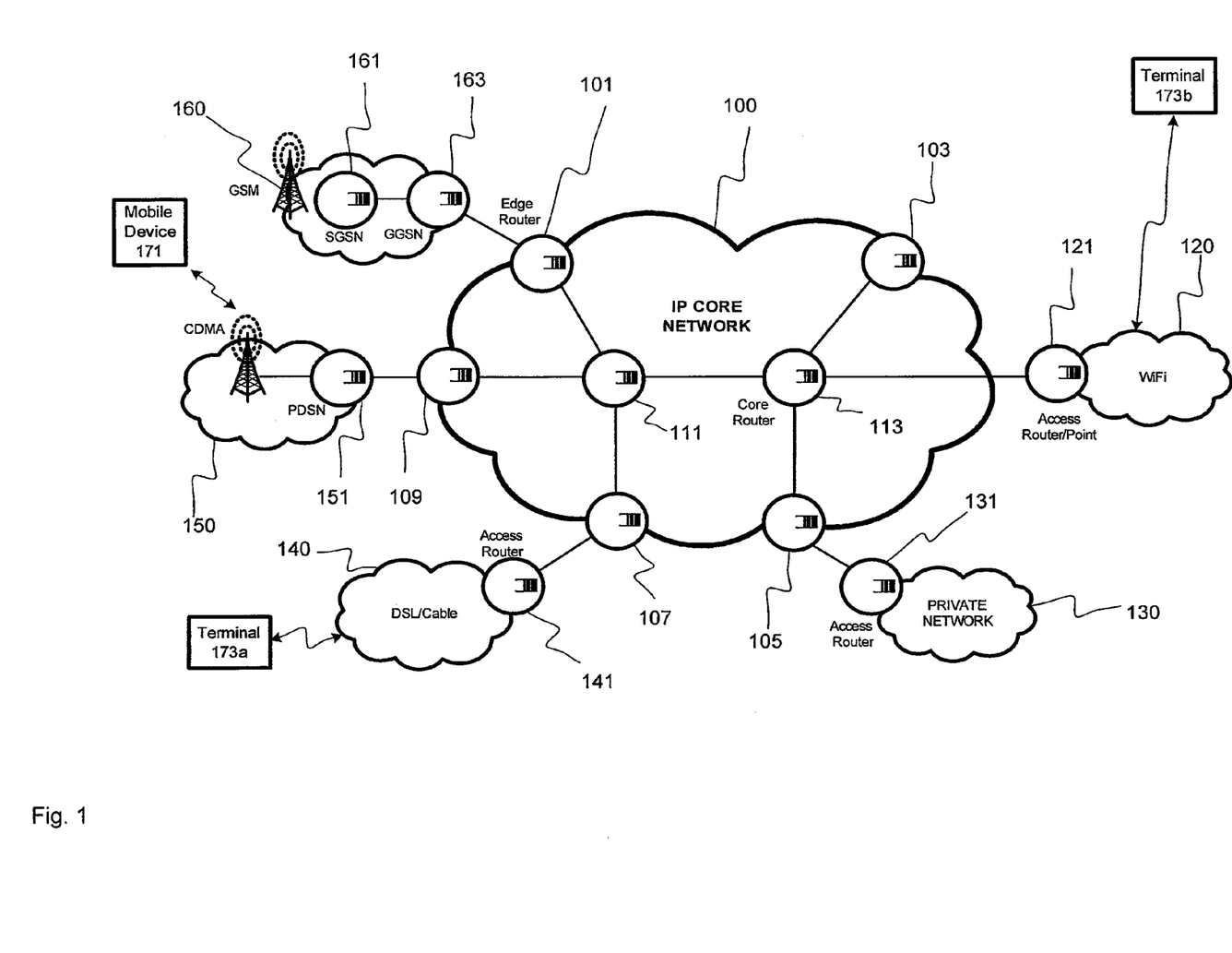
FIG. 1 depicts an exemplary IP Network diagram illustrating Edge, Access and Core routers in various IP networks, wherein various routing elements may utilize dynamic buffer sizing.

FIG. 1 is an exemplary IP network diagram illustrating Edge, Access and Core routers in various IP networks, as well as several terminal devices communicating via the networks.

In today's networks, the IP-based Core Network 100 connects various wireless and wireline access networks for communication among themselves. The access networks may include Cable and Digital Subscriber Line (DSL) Networks 140, Global System for Mobile Communications (GSM) Networks 160, Code Division Multiple Access (CDMA) Network 150, Wireless Fidelity (WiFi) Access Networks 120, Private Network 130, just by way of examples, as shown in FIG. 1. IP routers are deployed in both access and core networks in the form of access routers, edge routers, core routers, APs, SGSNs, GGSNs, PDSNs, and others.

IP Core Network 100 comprises Edge Routers 101, 103, 105, 107 and 109 positioned at the edge of the IP Core Network 100 for coupling to the respective access networks. The core network 100 also includes Core Routers, two of which are shown by way of example at 111 and 113. The Edge Routers in addition to routing traffic, generally perform QOS mechanisms for incoming packets, such as classification, marking, metering, policing/shaping, and scheduling.

The Edge Routers 101, 107 and 109 are connected to Core Router 111. Furthermore, Edge Routers 103 and 105 are connected to Core Router 113. Core Routers 111 and 113 are interconnected as well. Core Routers (or "interior" routers) may have minimal functionality and minimal overhead for providing differentiated services.

WiFi Network 120 is connected to IP Core Network 100 via Access Router/Point 121. Private Network 130 is connected to the Edge Router 105 of the IP Core Network 100 via Access Router 131. DSL/Cable Network 140 is connected to the Edge Router 107 of the IP Core Network 100 via Access Router 141. CDMA Wireless Network 150 is connected to the Edge Router 109 of the IP Core Network 100 via Access Router 151, which may be implemented by a PDSN. GSM Wireless Network 160 is connected to the Edge Router 101 of the IP Core Network 100 via a router function of the GGSN 163 and SGSN 161.

Mobile Device 171 is connected to CDMA Network 150. Mobile Device 171 may be exchanging data or making a voice-call with another user (not shown). Terminal 173a is connected to DSL/Cable Network 140. Terminal 173b is connected to WiFi Network 120. Terminal 173a is exchanging data with Terminal 173b.

As IP packets traverse across the various networks from source to destination, they must pass through one or more IP routers in transit. Without proper queue management functions in each router, it is difficult to meet strict end-to-end performance requirements of interactive real-time applications like VoIP and VT. The queues in each router must be configured optimally so that the end-to-end delay may not be more than, for example, 400 milliseconds for VoIP.

Figure 2:
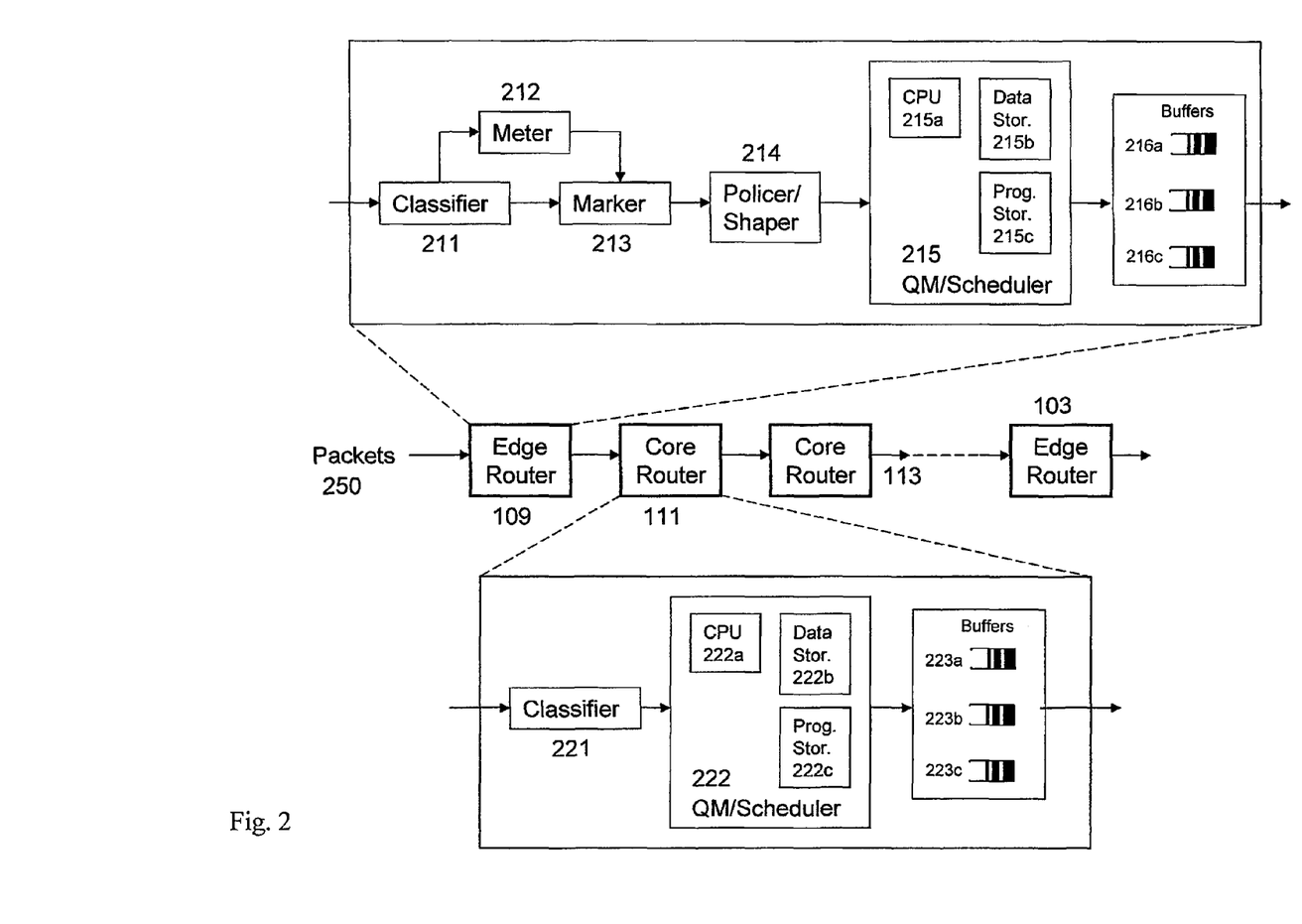
FIG. 2 depicts an exemplary IP Network diagram illustrating a scheduler in an edge router and illustrating a scheduler in a core router, wherein at least one of the schedulers controls the dynamic setting of optimal buffer size of the respective router.

FIG. 2 is an exemplary IP network diagram illustrating a scheduler in an edge router and illustrating a scheduler in a core router, wherein at least one of the schedulers controls the dynamic setting of optimal buffer size ($\overline{B}_T$ in bits and $\overline{N}_t$ in packets) according to the exemplary algorithm discussed below.

For discussion purposes, we will consider a sample path through the IP Core Network 100 from one access network to another access network. Hence, the example in FIG. 2 shows: Edge Router 109, Core Router 111, Core Router 113, and Edge Router 103. Edge Router 109 receives Packets 250, and comprises: Classifier 211, Meter 212, Marker 213, Policer/Shaper 214, Queue Management (QM)/Scheduler 215 and Buffers 216a, 216b and 216c. Core router 111 comprises Classifier 211, QM/Scheduler 222 and Buffers 223a, 223b and 223c.

Each router may be configured to provide QoS or Differentiated Services (DiffServ) as specified by the network designer. The edge router 109 generally performs several important mechanisms for incoming packets to provide QoS, such as classification, marking, metering, policing/shaping, and scheduling. Thus, core router (or "interior" router) 111 may have minimal functionality and minimal overhead for providing differentiated services.

For example, edge router 109 may perform sophisticated classification based on multiple fields of header information listed below, but core router 111 may just look at the Differentiated Services Code Point (DSCP) values in the IP header to classify incoming packets.

Classifier 211 and Classifier 221 may separate incoming IP packets into different classes. This classification may be based on one or more fields in a packet:

- IP flow identification: source IP address, destination IP address, IP protocol field, source port number, and destination port number.
- IP precedence or DSCP field.
- TCP/IP header parameters such as packet length.
- Source and destination Media Access Control (MAC) addresses.
- Application identification based on port numbers, Web Universal Resource Locator (URL) Addresses, etc.

Meter 212 may measure incoming traffic for conformance to a profile. The meter may determine whether a given packet stream conforms or exceeds the service level agreement.

Marker 213 may write/rewrite the DSCP field of IP packet's header to indicate which QoS class the packet belongs to.

Policer/shaper 214 may delay traffic by buffering some packets so that they comply with the service level agreement profile, and may drop all packets that do not comply with the traffic profile.

QM/Scheduler 215 and QM/Scheduler 222 may be responsible for determining which packets to transmit as well as setting the buffer size and managing how to drop packets. When packets in edge router 109 are placed in buffers based on DSCP values, QM/Scheduler 215 may decide which packets are transmitted first from which buffer, thus determining end-to-end performance requirements. Further, when packets in Core Router 111 are placed in buffers based on DSCP values, QM/Scheduler 215 may decide which packets are transmitted first from which buffer, thus determining end-to-end performance requirements. QM/Scheduler 215 and QM/Scheduler 222 may be a weighted fair queuing scheduler, a weighted round robin scheduler or a deficit round robin scheduler. For real-time interactive applications, such as VoIP, which require an end-to-end delay of not more than 150 msec to 350 msec for a natural interactive (two way) conversation, QM/Scheduler 215 and QM/Scheduler 222 is a critical component for controlling congestion.

Buffers 216a, 216b and 216c receive data from QM/Scheduler 215. The QM/Scheduler 215 is responsible for changing the size of Buffers 216a, 216b and 216c, for example, by changing the amounts of memory allocated for the respective buffers. Buffers 216a, 216b and 216c queue the incoming packets of data and the queued data is forwarded to its destination. It is noted that in the example of FIG. 2, Edge Router 109 contains three buffers of similar size. However, the buffers contained in each router may be of a variable number and further each buffer is of a variable size. This helps ensure that each buffer is capable of satisfying the tradeoff between a buffer that is small enough to meet network packet delay requirements and, at the same time, large enough to have a high throughput (low packet loss).

The exemplary QM/Scheduler 215 thereof includes one or more processors serving as a Central Processing Unit (CPU) 215a. The QM/Scheduler 215 also has one or more Data Storage 215b devices shown as "Data Stor. 215b" and one or more Programmable Storage 215c devices shown as "Prog. Stor. 215c." Programmable Storage 215c contains executable code, which causes the CPU 215a to implement the functions of the QM/Scheduler 215.

Buffers 223a, 223b and 223c receive data from QM/Scheduler 222. The QM/Scheduler 222 is responsible for changing the size of Buffers 223a, 223b and 223c. Buffers 223a, 223b and 223c queue the incoming packets of data and the queued data is forwarded to its destination. It is noted that in the example of FIG. 2, Core Router 111 contains three buffers of similar size. However, the buffers contained in each router may be of a variable number and further each buffer is of a variable size. This helps ensure that each buffer is capable of satisfying the tradeoff between a buffer that is small enough to meet network packet delay requirements and, at the same time, large enough to have a high throughput (low packet loss).

The exemplary QM/Scheduler 222 thereof includes one or more processors serving as a Central Processing Unit (CPU) 222a. The QM/Scheduler 222 also has one or more Data Storage 222b devices shown as "Data Stor. 222b" and one or more Programmable Storage 222c devices shown as "Prog. Stor. 222c." Programmable Storage 222c contains executable code, which causes the CPU 222a to implement the functions of the QM/Scheduler 222.

In today's IP networks, QoS is implemented to optimize the performances of different applications with different performance objectives. The main idea of QoS is to partition a set of applications with similar performance objectives and to allocate resources accordingly. For example, interactive real-time applications like voice traffic may be put into one buffer (i.e., high QOS class). Audio/video streaming traffic may be put into another buffer (i.e., medium QOS class), while file transfer, email, and web browsing traffic may be put into a third buffer (i.e., low QOS class or a best-effort queue). Therefore, each buffer will have its own QOS performance objectives.

The performance requirements associated with each buffer can be determined from the end-to-end performance objective of the application(s) in the respective queue. For example, if the end-to-end delay for VoIP is 150 msec, and the maximum number of hops for VoIP in the network that the routing protocol can take is 10, then the maximum delay at each hop is 15 msec. Therefore, the network is typically planned to ensure that VoIP traffic does not take more than 10-12 hops due to delay constraints. As will be shown below, the optimal buffer sizes ($\bar{B}_T$ in bits and $\bar{N}_t$ in packets) depend on mean arrival rate, mean delay, mean packet size, and outgoing link speed.

In order to reduce the probability of dropping packets of data, larger buffers at each router may be employed and/or multiple buffers at each router may be employed. While the larger buffers will certainly minimize the packet loss in the network in the case of traffic congestion, as the buffers fill up the delays encountered by each packet would increase dramatically. On the other hand, if the buffers are too small, while the delay may be reduced, the packets will be dropped too frequently. Hence, the optimal buffer sizes are determined in order to ensure that the buffer size is small enough to meet the delay requirement, and at the same time, large enough to have a high throughput (low packet loss). The exemplary methodology may determine the number of packets received over a known period of time. The exemplary methodology may then utilize the relationship among mean arrival rate and mean packet size in order to determine the optimal buffer size ($\bar{B}_T$ in bits and $\bar{N}_t$ in packets). The optimal buffer sizes may be dynamically adjusted in order to compensate for the bursty-nature of IP traffic.

Little's Law states that the average buffer occupancy in a queuing system is equal to the average arrival rate times the average time spent in that system. Namely, $\bar{N} = \bar{a} \cdot \bar{D}$, where $\bar{N}$ is the mean buffer occupancy, $\bar{a}$ is the mean packet arrival rate, and $\bar{D}$ is the mean delay per packet in the steady state. This long-run steady state relationship is extended to any time interval, i.e. between 0 and T.

For example, consider any time interval [0, t]. If A(t) corresponds to the number of packet arrivals, and C(t) corresponds to the number of packet departures in [0, t], then the number of packets remaining in the system is expressed by E(t):

$$E(t) = A(t) - C(t) \tag{3}$$

The mean arrival rate in [0,t] is:

$$\bar{a}_t = A(t)/t \tag{4}$$

Therefore, the total time spent by all packets in the system up until time t is the area between the curves A(t) and C(t), and can be computed as:

$$S(t) = \int_0^t (A(t) - C(t))dt \tag{5}$$

The mean waiting time is then found from:

$$\bar{D}_t = S(t)/A(t) \tag{6}$$

Also, the optimal buffer size (or occupancy) is:

$$\bar{N}_t = S(t)/A(t) \tag{7}$$

Finally, from equations (6) and (7) we have:

$$\bar{N}_t = \frac{S(t)}{t} = \frac{\bar{D}_t \cdot A(t)}{t} = \bar{a}_t \bar{D}_t \tag{8}$$

Then, we transform the result in terms of the number of bits. The optimal buffer size in terms of the number of bits can be estimated by multiplying both sides of equation (8) by the mean packet sizes, $\bar{p}_t$:

$$\bar{B}_t = \bar{N}_t \bar{p}_t = \bar{a}_t \bar{D}_t \bar{p}_t = \bar{\lambda}_t \bar{D}_t, \text{ since } \bar{\lambda}_t = \bar{a}_t \bar{p}_t \tag{9}$$

Equation (9) should be bounded by the link speed μ for a stable system.

For any given time interval [0, T], if $\bar{B}_t$ is the optimal buffer size (in bits), $\bar{p}_T$ is the mean packet size (in bits), $\bar{a}_T$ is the mean arrival rate (in packets), and $\bar{\lambda}_t$ is the mean arrival rate (in bits), then the optimal buffer occupancy (in bits) can be estimated as:

$$\bar{B}_T = \bar{\lambda}_T \bar{D}_T, \text{ if } \bar{\lambda}_T \leq \mu \tag{10}$$

$$\bar{B}_T = \mu \bar{D}_T, \text{ if } \bar{\lambda}_T \geq \mu \tag{11}$$

The above result can also be stated in terms of the number of packets:

$$\bar{N}_T = \bar{a}_T \bar{D}_T, \bar{a}_T \bar{p}_T \leq \mu \tag{12}$$

$$\bar{N}_T = (\mu/\bar{p}_T) \cdot \bar{D}_T, \bar{a}_T \bar{p}_T \geq \mu \tag{13}$$

The results above have the following features. First, the optimal buffer size should be applied to each queue in the router. In the case of QoS support within a router, the optimal buffer size should be applied to individual QoS queues within the router. Furthermore, the optimal buffer size is computed as the product of the mean arrival rate and the mean delay, as long as the mean arrival rate is less than link speed. However, if the mean arrival rate equals or exceeds the link speed, then the buffer size is bounded by the product of the link speed and the mean delay. The mean arrival rate may be estimated during the time window size of T, by a weighted moving average technique, and updated accordingly in the next time window. Additionally, the mean delay ($\overline{D}_T$) for each QoS queue at each router/hop should be estimated by the end-to-end delay of each QoS queue/application divided by the maximum number of hops allowed for the application. However, if desired, the mean delay can be estimated by the same technique as the mean arrival rate, by using a weighted moving average. It is noted that all of the necessary information is available at the router and signaling of each router is not required. Alternatively, the optimal buffer size may also be calculated utilizing the units of packets ($\overline{N}_T$) as opposed to units of bits ($\overline{B}_T$).

Figure 3:
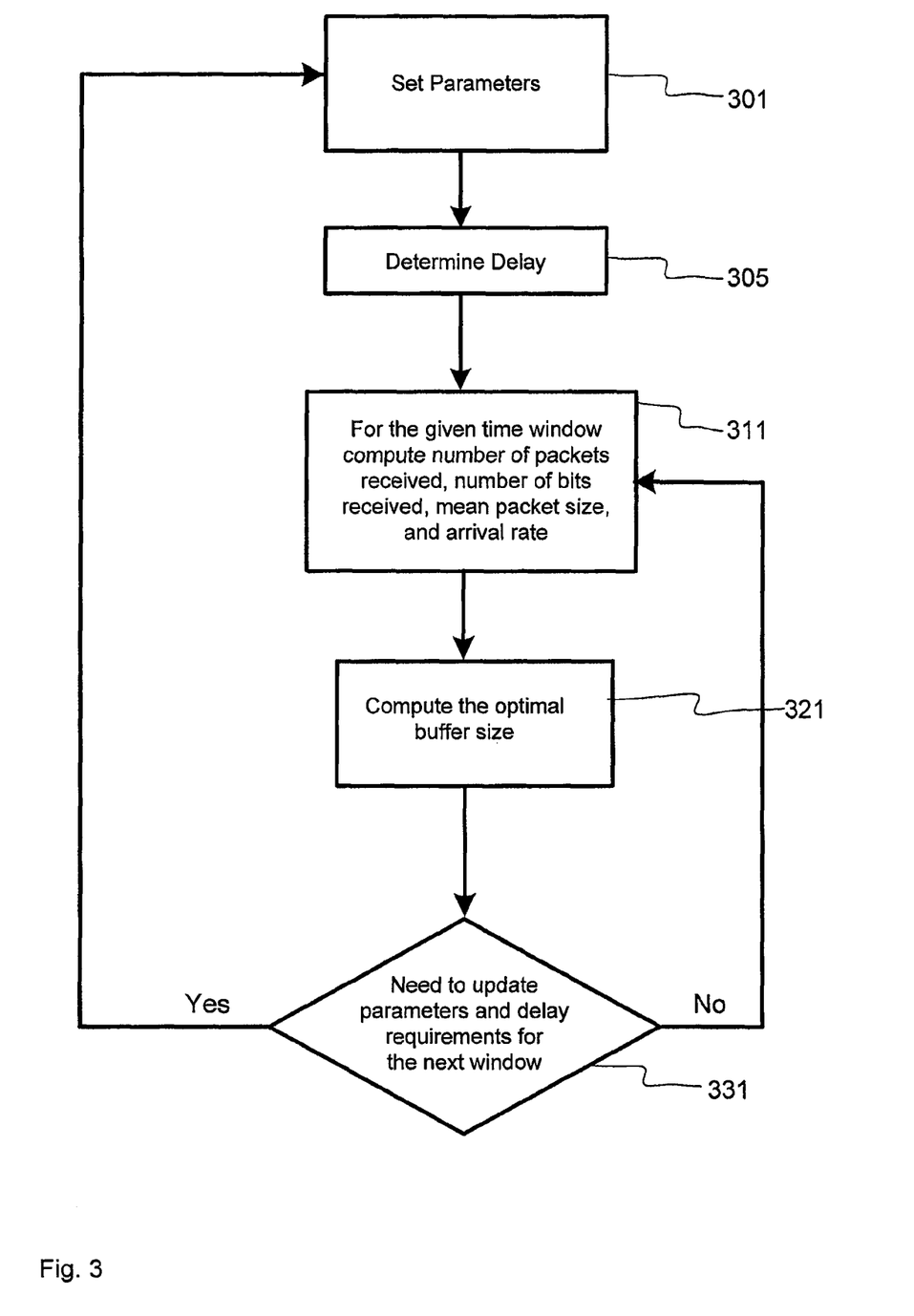
FIG. 3 is an exemplary flow chart illustrating an algorithm for calculating optimal buffer size.

An exemplary algorithm for determining an optimum buffer size ($\overline{B}_T$ in bits and $\overline{N}_T$ in packets) is formally stated below using a weighted moving average. After the variables, a detailed description of the proposed algorithm follows (as shown in FIG. 3). For this algorithm, the following notations are used.

Variables of Algorithm

T: time window size $\overline{N}_{iT}$: optimum buffer/queue size (in number of packets) for the $i^{th}$ time window of size T $\overline{B}_{iT}$: optimum buffer/queue size (in bits) for the $i^{th}$ time window of size T eteD: end-to-end delay NumHops: maximum number of hops allowed in the network $\overline{D}_{iT}$: mean delay for the $i^{th}$ time window of size T $\overline{D}$: mean delay or waiting time for each queue or application $\overline{a}_{iT}$: mean arrival rate (in number of packets) for the $i^{th}$ time window of size T $\overline{\lambda}_{iT}$: mean arrival rate (in bits) for the $i^{th}$ time window of size T $\mu$: link speed or service rate (in bits/sec)

$BW_{iT}$: total number of bits received (during time T) for the $i^{th}$ time window of size T $p_{ij}$: packet size for $j^{th}$ packet for the $i^{th}$ time window of size T $\overline{p}_{iT}$: mean packet size for the $i^{th}$ time window of size T $m_{iT}$: number of packets received for the $i^{th}$ time window of size T Steps of Algorithm Step 1. Initialization.

i. Set the time window size, T.

Step 2. Compute the delay at each buffer.

$$\overline{D} = \overline{D}_{iT} = eteD/\text{NumHops} \quad (14)$$

Step 3. Compute the total number of packets ($m_{iT}$) and the total number of bits received during time T Then, compute the mean packet size, packet arrival rate and bandwidth arrival rate for the $i^{th}$ time window of size T. Compute the delay at each buffer.

$$BW_{iT} = \sum_{k=1}^{m_{iT}} p_{ik} \quad (15)$$

$$\overline{p}_{iT} = BW_{iT}/m_{iT} \quad (16)$$

$$\overline{a}_{iT} = m_{iT}/T \quad (17)$$

$$\overline{\lambda}_{iT} = BW_{iT}/T \quad (18)$$

It is recommended to take weighted moving averages to smooth out any abrupt fluctuations:

$$\overline{a}_{iT} = w \cdot \overline{a}_{i-1,T} + (1-w) \cdot \overline{a}_{iT} \quad (19)$$

$$\overline{\lambda}_{iT} = w \cdot \overline{\lambda}_{i-1,T} + (1-w) \cdot \overline{\lambda}_{iT} \quad (20)$$

$$\overline{p}_{iT} = w \cdot \overline{p}_{i-1,T} + (1-w) \cdot \overline{p}_{iT} \quad (21)$$

Step 4. Compute the optimal buffer size for the given queue.

i. The optimal buffer size, $\overline{N}_T$, in number of packets is:

$$\overline{N}_{iT} = \overline{a}_{iT} \overline{D}_{iT}, \ \overline{a}_{iT} \overline{p}_{iT} < \mu \quad (22)$$

$$\overline{N}_{iT} = (\mu/\overline{p}_{iT}) \cdot \overline{D}_{iT}, \ \overline{a}_{iT} \geq \mu \quad (23)$$

ii. The optimal buffer size, $\overline{B}_T$, in number of bits is:

$$\overline{B}_{iT} = \overline{\lambda}_{iT} \overline{D}_{iT}, \ \overline{\lambda}_{iT} < \mu \quad (24)$$

$$\overline{B}_{iT} = \mu \overline{D}_{iT}, \ \overline{\lambda}_{iT} \geq \mu \quad (25)$$

Step 5. Go to Step 3, and compute the optimal buffer size ($\overline{B}_T$ in bits and $\overline{N}_T$ in packets) for the next $(i+1)^{th}$ time window over $[T, 2T]$.

In order to facilitate an understanding of how the algorithm works, the algorithm is now described in greater detail in accordance with FIG. 3. FIG. 3 is an exemplary flowchart illustrating the algorithm, in order to calculate the optimal buffer size according to the present invention.

At 301, the initialization parameters are set. In this example, consider any time window of size T and consider the $i^{th}$ time window on $[0, T]$. Specifically, the time window size is set as T. T is the duration of time for each period that will be used to compute the optimal buffer size.

At 305, the delay ($\overline{D} = \overline{D}_{iT}$) for each buffer is set. The delay is typically computed by dividing the end-to-end delay by the maximum number of hops allowed in the network. The delay is the same for all time windows, unless the value needs to be updated in the next window. Alternatively, the algorithm may also calculate the optimum buffer size by utilizing either the mean delay in each time window or the weighted moving average of mean delays as the delay ($\overline{D} = \overline{D}_{iT}$) for each buffer.

At 311, the number of packets received ($m_{iT}$) and the total number of bits received ($BW_{iT}$) during the $i^{th}$ time window are computed. From the number of packets received ($m_{iT}$) and the total number of bits received ($BW_{iT}$) during the $i^{th}$ time window, the mean packet size ($\overline{p}_{iT}$), the arrival rate in number of packets ($\overline{a}_{iT}$) and the arrival rate in number of bits ($\overline{\lambda}_{iT}$) are determined. It is recommended to take weighted moving averages of the mean arrival rates and the packet sizes for more accurate estimations to smooth out any abrupt fluctuations, using equations (19), (20), and (21).

At 321, the optimal buffer size in number of packets ($\overline{N}_{iT}$) is computed by multiplying the mean packet arrival rate ($\overline{a}_{iT}$) and the delay $\overline{D}_{iT}$. The optimal buffer size in number of bits ($\overline{B}_{iT}$) is also determined.

At 331, if the parameters and delay need to be updated, then processing returns to 301. For example, the delay may have changed and the processing may need to be changed accordingly. If the parameters and delay do not need to be updated, then processing returns to 311 in order to compute the optimal buffer size for the next time window, the $(i+1)^{th}$ window.

Numerical Results

Real-time applications and non real-time applications have very different performance objectives. Non real-time applications, i.e. file transfer, can tolerate delay, but are very sensitive to dropped packets. Therefore, TCP's retransmission is used in case packets are dropped. On the other hand, real-time applications, i.e. voice, can tolerate some dropped packets, but are very sensitive to delay. Hence, UDP is utilized for the fast delivery of data without retransmission when packets are dropped. As a result, there is a trade off in determining whether to set the buffer sizes as smaller or larger.

Table 1 (shown below) illustrates the differences between calculating the buffer sizes for the Dynamic Buffer Size Algorithm and the BPD method. BPD is a static method that results in a constant buffer size for all queues regardless of the QoS performance requirements. Therefore, BPD depends exclusively on the link speed ($\mu$) and RTT (TCP round-trip delay). The Dynamic Buffer Size Algorithm sets a buffer threshold for each queue ($\alpha$) separately, and dynamically adjusts this setting based on the mean arrival rate ($\overline{\lambda_{iT}}$) for each time window (i) and the mean delay ($\overline{D_{iT}}$) required for each queue.

TABLE 1

Dynamic Buffer Size Algorithm and BPD

| Dynamic Buffer Sizing for Each Queue, $\alpha = 1, 2, \ldots k$ | BPD |
|---|---|
| $\overline{B_{iT}^\alpha} = \overline{\lambda_{iT}^\alpha} \cdot \overline{D_T^\alpha}, \overline{\lambda_{iT}^\alpha} < \mu$ $\overline{B_{iT}^\alpha} = \mu \cdot \overline{D_T^\alpha}, \overline{\lambda_{iT}^\alpha} \geq \mu$ | $B = \mu \cdot RTT$ |

In computing the required buffer sizes for the two methods, it was assumed that there were two queues: (1) real-time applications, i.e. voice and (2) non real-time applications, i.e. File Transfer Protocol (FTP), email, or web browsing. The link speed was assumed to be 100 Mbps, and TCP's RTT was assumed to be equal to a typical value of 250 msec. For end-to-end performance requirements, the performance requirement at each node was assumed to be equal to 15 msec for real-time applications and 400 msec for non real-time applications. For the Dynamic Buffer Size Algorithm, the buffer sizes are bounded by the link speed; 100 Mbps in this example. Furthermore, when the mean arrival rate is greater than the link speed, then the mean arrival rate is set equal to the link speed.

Table 2 illustrates the simulated required buffer sizes that results from the Dynamic Buffer Size Algorithm and BPD for a queue serving real-time applications, i.e. voice. While the Dynamic Buffer Size Algorithm dynamically adjusts the buffer sizes in order to meet the 15 msec delay, BPD maintains a constant queue size of 25 mega bits (MB).

TABLE 2

Buffer Sizes for Real-Time Applications

| Arrival Rate, $\lambda_T$ (Mbps) | Dynamic Buffer Sizing (MB) | BPD (MB) |
|---|---|---|
| 10 | 0.15 | 25 |
| 20 | 0.30 | 25 |
| 30 | 0.45 | 25 |
| 40 | 0.60 | 25 |
| 50 | 0.75 | 25 |
| 60 | 0.90 | 25 |

TABLE 2-continued

Buffer Sizes for Real-Time Applications

| Arrival Rate, $\lambda_T$ (Mbps) | Dynamic Buffer Sizing (MB) | BPD (MB) |
|---|---|---|
| 70 | 1.05 | 25 |
| 80 | 1.20 | 25 |
| 90 | 1.35 | 25 |
| 100 | 1.50 | 25 |
| >100 | 1.50 | 25 |

For real-time applications, i.e. voice, packet delay is of utmost importance and as a result it is better for the network to drop packets rather than queuing them up resulting in delays. Therefore, a very large buffer is not always preferable even with a small arrival rate because as traffic conditions change, the large buffer's capacity will be reduced resulting in packet delays. As illustrated in Table 2, the Dynamic Buffer Size Algorithm consistently sets smaller buffer sizes than BPD. As the arrival rate increases, the Dynamic Buffer Size Algorithm dynamically increases the size of the buffer (ranging from 0.15 to 1.5 MB), whereas BPD maintains a constant, large buffer size of 25 MB, regardless of the current traffic conditions.

Table 3 illustrates the simulated required buffer sizes that results from the Dynamic Buffer Size Algorithm and BPD for a queue serving non-real-time applications. While the Dynamic Buffer Size Algorithm dynamically adjusts the buffer sizes in order to meet the 15 msec delay, BPD maintains a constant queue size of 25 MB.

TABLE 3

Buffer Sizes for Non Real-Time Applications

| Arrival Rate, $\lambda_T$ (Mbps) | Dynamic Buffer Sizing (MB) | BPD (MB) |
|---|---|---|
| 10 | 4 | 25 |
| 20 | 8 | 25 |
| 30 | 12 | 25 |
| 40 | 16 | 25 |
| 50 | 20 | 25 |
| 60 | 24 | 25 |
| 70 | 28 | 25 |
| 80 | 32 | 25 |
| 90 | 36 | 25 |
| 100 | 40 | 25 |
| >100 | 40 | 25 |

For non-real-time applications, minimizing packet loss by employing larger buffer sizes is preferable over reducing the packet delay. As illustrated in Table 3, the Dynamic Buffer Size Algorithm initially sets smaller buffer sizes than BPD. However, as the arrival rate increases, the Dynamic Buffer Size Algorithm dynamically increases the size of the buffer (ranging from 0.15 to 1.5 MB) eventually resulting in larger buffer sizes than BPD, whereas BPD maintains a constant, large buffer size of 25 MB, regardless of the current traffic conditions.

Both Tables 2 and 3 illustrate the strengths of the new Dynamic Buffer Size Algorithm; the Dynamic Buffer Size Algorithm dynamically changes the buffer size to account for the changes in the current traffic conditions, whereas BPD is a static method which sets one constant buffer threshold regardless of the current traffic conditions.

ADVANTAGES

The Dynamic Buffer Size Algorithm may be implemented as part of a scheduling/queue management module in the Edge, Access and Core Routers, which are used in both wireline and wireless networks. Furthermore, the Dynamic Buffer Size Algorithm may be implemented in software or hardware. The Dynamic Buffer Size Algorithm offers the optimal buffer size for each QoS queue, based on traffic conditions and performance requirements: a smaller buffer size for real-time applications and a larger buffer size for non real-time applications. The Dynamic Buffer Size Algorithm offers several advantages:

- The Dynamic Buffer Size Algorithm is simple and easy to implement in real IP networks. Unlike existing methods, the Algorithm does not require any outside signaling from other routers or end systems for the execution of the Algorithm. In fact, all of the required information is available at the router.
- The Dynamic Buffer Size Algorithm is designed to optimize both packet delay and packet loss and is suitable for both TCP and UDP applications. Currently existing methods are developed for TCP-based applications to minimize packet loss and end up overestimating the buffer size requirement. However, overestimating the buffer size requirement is not suitable for real-time applications like voice, which require tight delay requirements.
- The Dynamic Buffer Size Algorithm is designed to set the buffer threshold for each QoS queue by computing the delay, mean arrival rate and packet length, thus optimizing the performance of each queue with its own QoS requirements.
- The Dynamic Buffer Size Algorithm is dynamic in nature. The Algorithm constantly updates the optimal buffer size settings based on the current traffic conditions. IP data traffic is bursty in nature with variable packet sizes. Therefore, even if the buffer size was initially set correctly in a static buffer sizing method, this setting becomes suboptimal as the traffic condition changes.

The Dynamic Buffer Size Algorithm outlined above is very easy to implement. The complexity of the dynamic buffer sizing Algorithm is of order 1, or O(1), thus not adding any overhead to the system.

Further, the techniques disclosed herein are not limited to communication system schedulers for internet protocol packets. For example, a shipping system may ship packages, and the packages may be scheduled by a scheduler. The size of incoming "packets" may be measured in weight or volume, or a combination of weight and volume. Also, the "queues" of a shipping system may be classes such as overnight delivery packages, standard delivery packages, and economy delivery packages. These queues (or classes) do not have to be physically separated into distinct physical queues in order for the scheduler to schedule them.

As another example, a manufacturing system may process containers of parts using a scheduler, and the size of incoming "packets" may be equivalent to the number of parts in the "packet." Broadly, a scheduler is any device that allocates a shared resource.

As shown by the above discussion, many of the functions relating to dynamically adjusting the buffer capacities within a router, are implemented on one or more processors in a router or the like.

As known in the data processing and communications arts, such a processor typically comprises a central processing unit (CPU) or similar device, an internal communications bus, various types of memory or storage media (RAM, ROM, EEPROM, cache memory, disk drives, etc.) for code and data storage, and one or more interfaces for inter-device communication purposes with other elements of the router. The software functionalities involve programming, including executable code as well as associated stored data, e.g. objects for the data processing and related signaling performed by the EBS. The software code is executable by the CPU. In operation, the code is stored within the storage media in or associated with the CPU. At other times, however, the software may be stored at other locations and/or transported for loading into the router. Execution of such code by a processor of the router enables the router platform to implement the methodology for adjusting buffer capacity in essentially the manner performed in the embodiments discussed and illustrated herein. As used herein, terms such as computer or machine "readable medium" therefore refer to any tangible storage medium capable of participating in providing instructions to a processor for execution.

The concepts discussed above are amenable to a variety of changes and/or adaptations. For example, in the specific examples above, the optimal buffer sizes were controlled by the scheduler. Those skilled in the art will recognize, however, that such processing may be implemented in other parts of the router such as the policer/shaper, classifier, marker, meter, etc.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

APs—wireless Access Points
BDP—Bitrate-Delay Product
BSs—Base Stations
CDMA—Code Division Multiple Access
DiffServ—Differentiated Services
DSCP—Differentiated Services Code Point
DSL—Digital Subscriber Line
FTP—File Transfer Protocol
GPRS—General Packet Radio Services
GGSNs—Gateway GPRS Serving Nodes
GSM—Global System for Mobile Communications
IP—Internet Protocol
MAC—Media Access Control
MB—megabits
Mbps—megabits per second
msec—milliseconds
PSNs—Packet Data Serving Nodes
QoS—Quality of Service
RTT—Round-Trip-Time
SGSNs—Serving GPRS Support Nodes
TCP/IP—Transmission Control Protocol/Internet Protocol
UDP—User Datagram Protocol
URL—Universal Resource Locator
VoIP—Voice over Internet Protocol
VT—Video Telephony
WiFi—Wireless Fidelity

What is claimed is:

1. A method implemented in a router having a buffer with a capacity, for dynamically adjusting the capacity of the buffer, the method comprising steps of:
   determining a packet arrival rate, based at least partially on a number of packets arriving at the router;
   determining a delay time during which a packet remains in the router;
   computing an updated capacity for the buffer from the packet arrival rate and the delay time; and
   adjusting the capacity of the buffer to the updated capacity computed from the packet arrival rate and the delay time,
   wherein the delay time is an average delay time, of packets in a steady state in the router, computed based on a plurality of delay times of a plurality of packets arriving at the router within a pre-determined period of time.

2. The method of claim 1, wherein the packet arrival rate is a number of packets arriving at the router within a pre-determined period of time.

3. The method of claim 1, wherein the packet arrival rate is a mean arrival rate determined based on numbers of packets arriving at the router within consecutive periods of time.

4. The method of claim 1, wherein the packet arrival rate is computed as a weighted moving average of packet arrival rates computed for consecutive periods of time.

5. The method of claim 1, wherein the average delay time is computed based on a weighted sum of a plurality of average delay times computed in consecutive periods of time.

6. The method of claim 1, wherein each delay time of the plurality of delay times is an end-to-end delay divided by a number of hops.

7. A router comprising a buffer, wherein the router is configured to dynamically adjust the capacity of the buffer by performing functions comprising:
   determining a packet arrival rate, based at least partially on a number of packets arriving at the router;
   determining a delay time during which a packet remains in the router;
   computing an updated capacity for the buffer from the packet arrival rate and the delay time; and
   adjusting the capacity of the buffer to the updated capacity computed from the arrival rate and the packet delay time
   wherein the delay time is an average delay time, of packets in a steady state in the router, computed based on a plurality of delay times of a plurality of packets arriving at the router within a pre-determined period of time.

8. The router of claim 7, wherein the packet arrival rate is a number of packets arriving at the router within a pre-determined period of time.

9. The router of claim 7, wherein the packet arrival rate is a mean arrival rate determined based on numbers of packets arriving at the router within consecutive periods of time.

10. The router of claim 7, wherein the packet arrival rate is computed as a weighted moving average of packet arrival rates computed for consecutive periods of time.

11. The router of claim 7, wherein the average delay time is computed based on a weighted sum of a plurality of average delay times computed in consecutive periods of time.

12. The router of claim 7, wherein each delay time of the plurality of delay times is an end-to-end delay divided by a number of hops.

13. The router of claim 7, wherein the router is configured for use as an element of a network providing wireless communication service.

14. A computer program product, comprising at least one non-transitory machine readable medium and executable code transported by the at least one machine readable medium, wherein execution of the code by at least one programmable processor of a router causes the at least one programmable processor to perform functions for dynamically adjusting a capacity of a buffer of the router, the functions comprising:
   a function which determines a packet arrival rate, based at least partially on a number of packets arriving at the router;
   a function that determines a delay time during which a packet remains in the router;
   a function which computes an updated capacity for the buffer from the packet arrival rate and the delay time; and
   a function that adjusts the capacity of the buffer to the updated capacity computed from the packet arrival rate and the delay time,
   wherein the delay time is an average delay time, of packets in a steady state in the router, computed based on a plurality of delay times of a plurality of packets arriving at the router within a pre-determined period of time.

15. The computer program product according to claim 14, wherein the packet arrival rate is a number of packets arriving at the router within a pre-determined period of time.

16. The computer program product according to claim 14, wherein the packet arrival rate is a mean arrival rate determined based on numbers of packets arriving at the router within consecutive periods of time.

17. The computer program product according to claim 14, wherein the packet arrival rate is computed as a weighted moving average of packet arrival rates computed for consecutive periods of time.

18. The computer program product according to claim 14, wherein the average delay time is computed based on a weighted sum of a plurality of average delay times computed in consecutive periods of time.

19. The computer program product according to claim 14, wherein each delay time of the plurality of delay times is an end-to-end delay divided by a number of hops.

20. A router comprising a buffer, wherein the router is configured to dynamically adjust the capacity of the buffer by performing functions comprising:
   determining a packet arrival rate, based at least partially on a number of packets arriving at the router;
   determining a delay time during which a packet remains in the router;
   determining an updated capacity for the buffer based on the packet arrival rate and the delay time; and
   adjusting the capacity of the buffer to the updated capacity, wherein:
   the delay time is an average delay time of each packet in a steady state in the router, and
   the average delay time is computed based on a plurality of delay times of a plurality of packets arriving at the router within a pre-determined period of time.

21. The router of claim 20, wherein the packet arrival rate is a mean arrival rate of packets arriving at the router over time.

22. The router of claim 21, wherein the mean arrival rate is determined based on numbers of packets arriving at the router within consecutive periods of time.

23. The router of claim 20, wherein the packet arrival rate is computed as a weighted moving average of packet arrival rates computed for consecutive periods of time.

24. The router of claim 20, wherein the average delay time is computed based on a weighted sum of a plurality of average delay times computed in consecutive periods of time.

25. The router of claim 20, wherein the delay time is an end-to-end delay divided by a number of hops.

* * * * *